United States Patent
Li et al.

(10) Patent No.: US 12,340,604 B2
(45) Date of Patent: Jun. 24, 2025

(54) METHOD AND APPARATUS FOR RECOGNIZING TEXT, STORAGE MEDIUM, AND ELECTRONIC DEVICE

(71) Applicant: BOE Technology Group Co., Ltd., Beijing (CN)

(72) Inventors: Yue Li, Beijing (CN); Guangwei Huang, Beijing (CN); Xiaojun Tang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 397 days.

(21) Appl. No.: 17/789,147

(22) PCT Filed: Jun. 18, 2021

(86) PCT No.: PCT/CN2021/100837
§ 371 (c)(1),
(2) Date: Jun. 24, 2022

(87) PCT Pub. No.: WO2021/254478
PCT Pub. Date: Dec. 23, 2021

(65) Prior Publication Data
US 2023/0101426 A1 Mar. 30, 2023

(30) Foreign Application Priority Data
Jun. 18, 2020 (CN) .......................... 202010558741.7

(51) Int. Cl.
*G06V 30/14* (2022.01)
*G06V 30/142* (2022.01)
(Continued)

(52) U.S. Cl.
CPC ........ *G06V 30/1448* (2022.01); *G06V 30/142* (2022.01); *G06V 30/1456* (2022.01); *G06V 30/1463* (2022.01); *G06V 30/19* (2022.01)

(58) Field of Classification Search
CPC ........... G06V 30/1448; G06V 30/1456; G06V 30/19; G06V 30/1463; G06V 30/142
See application file for complete search history.

(56) References Cited

U.S. PATENT DOCUMENTS 9,031,831 B1 5/2015 Levchenko
10,133,951 B1 11/2018 Mendonca et al.
(Continued)

FOREIGN PATENT DOCUMENTS

CN 102890783 A 1/2013
CN 106231056 A 12/2016
(Continued)

OTHER PUBLICATIONS

CN202010558741.7 first office action.
CN 202010558741.7 third office action issued on Nov. 9, 2024.

*Primary Examiner* — Wednel Cadeau
(74) *Attorney, Agent, or Firm* — IPro, PLLC

(57) ABSTRACT

Provided is a method for recognizing a text. The method includes: acquiring a text image; determining at least one text box in the text image, wherein each of the at least one text box corresponds to at least one word; determining, from the at least one text box, a text box to be recognized; determining a picture unit corresponding to the text box to be recognized in the text image; rotating the picture unit to a target posture; and determining a target recognition result by performing text recognition on the picture unit in the target posture.

20 Claims, 10 Drawing Sheets

(51) Int. Cl.
  *G06V 30/146* (2022.01)
  *G06V 30/19* (2022.01)

(56) References Cited

U.S. PATENT DOCUMENTS

| | | | |
|---|---|---|---|
| 2011/0305393 A1 | 12/2011 | Nijemcevic et al. | |
| 2014/0122054 A1 | 5/2014 | Takano et al. | |
| 2019/0065476 A1* | 2/2019 | Kwon | ................... G06V 20/62 |

FOREIGN PATENT DOCUMENTS

| | | | | | |
|---|---|---|---|---|---|
| CN | 107679074 | A | | 2/2018 | |
| CN | 109145893 | A | | 1/2019 | |
| CN | 109325464 | A | * | 2/2019 | ............. G06F 40/58 |
| CN | 110717366 | A | | 1/2020 | |
| CN | 110766996 | A | | 2/2020 | |
| CN | 110807457 | A | | 2/2020 | |
| CN | 111680690 | A | * | 9/2020 | ........... G06K 9/3275 |
| CN | 111723586 | A | | 9/2020 | |
| EP | 3570208 | A1 | * | 11/2019 | ......... G06K 9/00449 |
| KR | 20060033973 | A | | 4/2006 | |
| WO | 2012086358 | A1 | | 6/2012 | |

* cited by examiner

Inclined state 1

Inclined state 2

METHOD AND APPARATUS FOR RECOGNIZING TEXT, STORAGE MEDIUM, AND ELECTRONIC DEVICE

CROSS-REFERENCE TO RELATED APPLICATION

This application is a national phase application based on PCT/CN2021/100837, filed on Jun. 18, 2021, which claims priority to Chinese Patent Application No. 202010558741.7, filed on Jun. 18, 2020 and entitled "TEXT RECOGNITION METHOD AND APPARATUS, STORAGE MEDIUM, AND ELECTRONIC DEVICE," the disclosures of which are incorporated herein by reference in their entireties.

TECHNICAL FIELD

The present disclosure relates to the field of text recognition technologies, in particular, relates to a method and apparatus for recognizing a text, a storage medium, and an electronic device.

BACKGROUND

In the related art, an image collection device or a device with an image collection function may collect images of texts, and then perform operations, such as text recognition, on the collected images.

SUMMARY

Embodiments of the present disclosure provide a method and apparatus for recognizing a text, a storage medium and an electronic device.

In one aspect, the embodiments of the present disclosure provide a method for recognizing a text. The method includes:
  acquiring a text image;
  determining at least one text box in the text image, wherein each of the at least one text box corresponds to at least one word;
  determining, from the at least one text box, a text box to be recognized;
  determining a picture unit corresponding to the text box to be recognized in the text image;
  rotating the picture unit to a target posture; and
  determining a target recognition result by performing text recognition on the picture unit in the target posture.

In some embodiments, determining, from the at least one text box, the text box to be recognized includes:
  determining a text box, of the at least one text box, most proximal to a specified position in the text image, as the text box to be recognized.

In some embodiments, the method is applicable to a text recognition pen; and acquiring the text image includes:
  acquiring the text image at the specified position, wherein the specified position is determined by a pen tip of the text recognition pen.

In some embodiments, determining the text box, of the at least one text box, most proximal to the specified position in the text image, as the text box to be recognized includes:
  determining, based on the specified position in the text image, a first reference region including the specified position;
  calculating an overlap area between the first reference region and each of the at least one text box in response to presence of a text box overlapped with the first reference region; and
  determining a text box, of the at least one text box, having the largest overlap area with the first reference region, as the text box to be recognized.

In some embodiments, upon determining, based on the specified position in the text image, the first reference region including the specified position, the method further includes:
  adjusting the first reference region in response to absence of a text box overlapped with the first reference region;
  calculating an overlap area between the adjusted first reference region and each of the at least one text box in response to presence of a text box overlapped with the adjusted first reference region; and
  determining a text box, of the at least one text box, having the largest overlap area with the adjusted first reference region, as the text box to be recognized.

In some embodiments, the method further includes:
  performing the process of adjusting the first reference region in response to absence of a text box overlapped with the adjusted first reference region.

In some embodiments, a number of times, for which the first reference region is adjusted, is less than a predetermined threshold.

In some embodiments, adjusting the first reference region includes:
  adjusting a size of the first reference region.

In some embodiments, determining the target recognition result by performing text recognition on the picture unit in the target posture includes:
  acquiring a first recognition result by performing text recognition on the picture unit in the target posture;
  determining a first confidence of the first recognition result; and
  determining the first recognition result as the target recognition result in response to the first confidence being greater than a confidence threshold.

In some embodiments, the first recognition result includes a plurality of text elements; and determining the first confidence of the first recognition result includes:
  acquiring a confidence, in the first recognition result, of each of the plurality of text elements; and
  determining an average of the confidences, in the first recognition result, of the text elements, as the first confidence.

In some embodiments, the method further includes:
  acquiring a rotated picture unit by rotating the picture unit by a predetermined angle in response to the first confidence being less than or equal to the confidence threshold;
  acquiring a second recognition result by performing text recognition on the rotated picture unit;
  determining a second confidence of the second recognition result; and
  determining a recognition result corresponding to a greater one of the first confidence and the second confidence as the target recognition result.

In some embodiments, the second recognition result includes a plurality of text elements; and determining the second confidence of the second recognition result includes:
  acquiring a confidence, in the second recognition result, of each of the plurality of text elements; and
  determining an average of the confidences, in the second recognition result, of the text elements as the second confidence.

In some embodiments, prior to determining the at least one text box in the text image, the method further includes:
  preprocessing the text image, wherein the preprocessing at least includes at least one of providing a white region surrounding the text image outside an edge of the text image and increasing a resolution.

In some embodiments, a boundary of the picture unit is polygonal; and rotating the picture unit to the target posture includes:
  determining a serial number of each vertex in the picture unit;
  acquiring, based on the serial number, by affine transformation, a coordinate transformation matrix; and
  acquiring the picture unit in the target posture by rotating, using the coordinate transformation matrix, the picture unit.

According to another aspect of the present disclosure, an apparatus for recognizing a text is provided. The apparatus includes:
  an acquiring module, configured to acquire a text image;
  a first determining module, configured to determine at least one text box in the text image, wherein each of the at least one text box corresponds to at least one word;
  a second determining module, configured to determine, from the at least one text box, a text box to be recognized;
  a picture determining module, configured to determine a picture unit corresponding to the text box to be recognized in the text image;
  a rotating module, configured to rotate the picture unit to a target posture; and
  a recognizing module, configured to acquire a target recognition result by performing text recognition on the picture unit in the target posture.

In some embodiments, the second determining module is configured to:
  determine a text box, of the at least one text box, most proximal to a specified position in the text image, as the text box to be recognized.

In some embodiments, the apparatus is applicable to a text recognition pen; and the acquiring module is configured to:
  acquire the text image at the specified position, wherein the specified position is determined by a pen tip of the text recognition pen.

In some embodiments, the second determining module is configured to:
  determine, based on the specified position in the text image, a first reference region including the specified position;
  calculate an overlap area between the first reference region and each of the at least one text box in response to presence of a text box overlapped with the first reference region; and
  determine a text box, of the at least one text box, having the largest overlap area with the first reference region, as the text box to be recognized.

In yet another aspect, the embodiments of the present disclosure further provide a storage medium storing a computer program thereon, wherein the computer program, when loaded and run by a processor, causes the processor to perform the method as defined in any one of the above aspects.

In still another aspect, the embodiments of the present disclosure further provide an electronic device. The electronic device at least includes a memory storing a computer program thereon, and a processor, wherein the computer program on the memory, when loaded and run by the processor, causes the processor to perform the method as defined in any one of the above aspects.

BRIEF DESCRIPTION OF THE DRAWINGS

For clearer descriptions of the technical solutions in the embodiments of the present disclosure or in the related art, the accompanying drawings required for describing the embodiments or the related art are briefly introduced hereinafter. Obviously, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the purposes, technical solutions, and advantages of embodiments of the present disclosure, the technical solutions of the embodiments of the present disclosure are clearly and completely described hereinafter with reference to the accompanying drawings of the embodiments of the present disclosure. Obviously, the embodiments described are merely some, but not all, embodiments of the present disclosure. Based on the described embodiments of the present disclosure, all other embodiments derived by a person of ordinary skill in the art without creative efforts shall fall within the protection scope of the present disclosure.

Unless otherwise defined, technical terms or scientific terms used in the present disclosure have the normal meaning understood by a person of general skill in the art. The terms "first," "second," and the like used in the present disclosure do not denote any order, quantity, or importance, and are merely used to distinguish different components. The terms such as "comprise" or "include," and the like mean that elements or objects appearing before the term cover the listed elements or objects and its equivalents appearing after the term, but do not exclude other elements or objects. The terms such as "connection" or "connected" and the like are not limited to physical or mechanical connection, and may include electrical connection and the connection may be direct or indirect. The terms such as "upper," "lower," "left," "right," and the like are only used to represent a relative position relationship. In the case that an absolute position of the described object is changed, the relative position relationship may also change accordingly.

For clarity and conciseness of the following description of the embodiments of the present disclosure, the detailed descriptions of known functions and components are omitted in the present disclosure.

In the related art, a user may use a point-translation pen in a natural pen-holding posture. A camera on the translation pen takes a picture of papers, and then a processor disposed on the translation pen recognizes or translates words on collected pictures.

Figure 1:
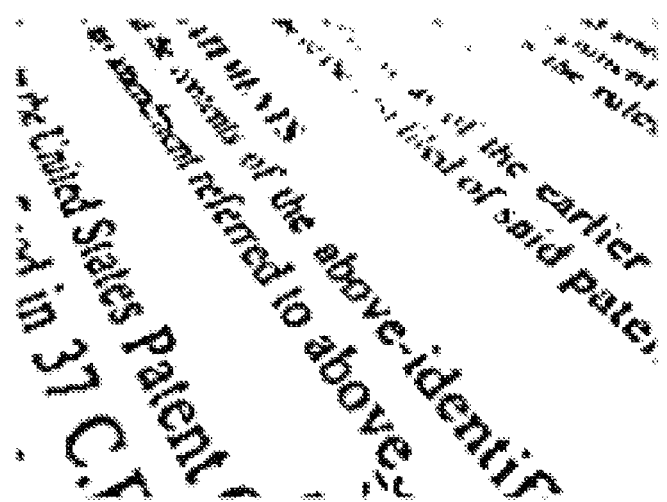
FIG. 1 is a schematic diagram of a large-angle inclined text in the related art.
Figure 2:
FIG. 2 is a schematic diagram of a large-angle inclined text in the related art.

FIG. 1 shows an image taken by a camera on a translation pen in the related art. It can be seen from this image that words are seriously inclined in the case that a user holds the pen obliquely. In this case, it is difficult to recognize the words based on a current word box positioning technology. As shown in FIG. 2, orientations of two word boxes are basically the same, but orientations of characters in the two boxes are greatly different, which means that the positions of the text boxes are cannot reflect the orientations of the characters in the boxes. Therefore, the key for correct recognition is how to correctly rotate the characters to a horizontal state.

Figure 3:
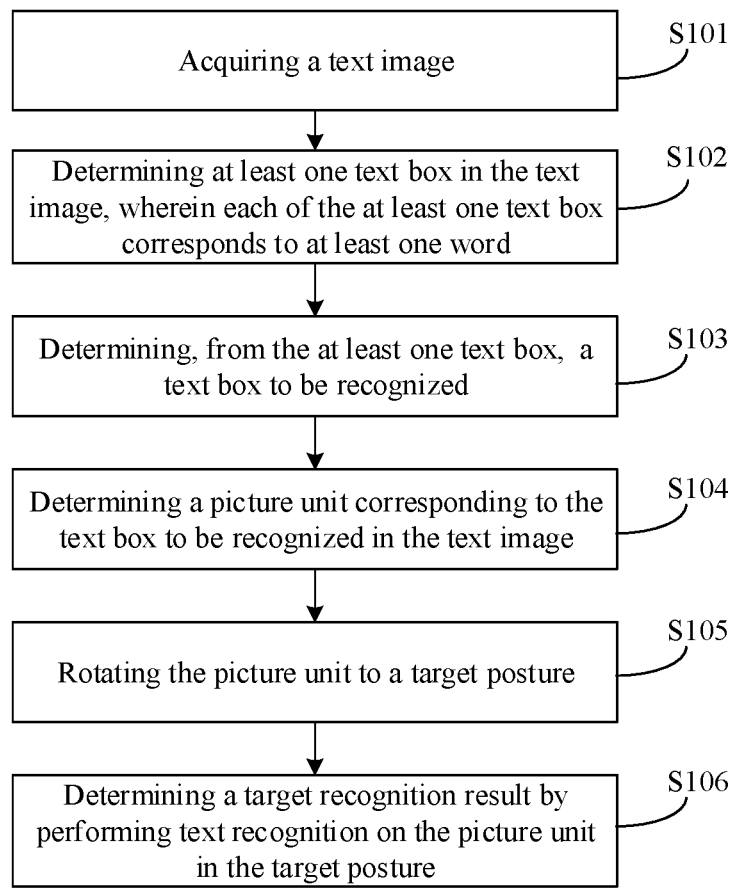
FIG. 3 is a schematic flowchart of a method for recognizing a text according to an embodiment of the present disclosure.

An embodiment of the present disclosure provides a method for recognizing a text. The method is used for recognizing or translating a text unit selected, by a user, from a text in the case that the user is browsing the text, so as to acquire a recognition result. The text here may refer to a text in the form of an article, a paragraph, a short sentence or the like. The text unit here refers to components in the text, such as a word, a word group, a phrase or the like. The recognition result here may be a literal recognition result corresponding to the text unit, or a translation result. The method for recognizing a text provided by the embodiment of the present disclosure may be applicable to an image collection device or an electronic device with an image collection function, such as a point-reading translation pen. The embodiment of the present disclosure takes the point-reading translation pen provided with an image collection device (or a text recognition pen with an image collection function) as an example for description. FIG. 3 is a flowchart of a method for recognizing a text according to an embodiment of the present disclosure. As shown in FIG. 3, the method may include the following processes.

In S101, a text image is acquired.

In S102, at least one text box is determined in the text image, wherein each of the at least one text box corresponds to at least one word.

In S103, a text box to be recognized is determined from the at least one text box.

In S104, a picture unit corresponding to the text box to be recognized is determined in the text image.

In S105, the picture unit is rotated to a target posture.

In S106, a target recognition result is determined by performing text recognition on the picture unit in the target posture.

In summary, according to the method for recognizing a text provided by the embodiment of the present disclosure, the text box including at least one word in the text image is firstly determined, and then character recognition is performed in the case that the text box to be recognized is rotated to a target posture suitable for recognition. In this way, a large-angle inclined text in the image can be recognized. As a result, the success rate and accuracy rate of text recognition are increased.

Figure 4:
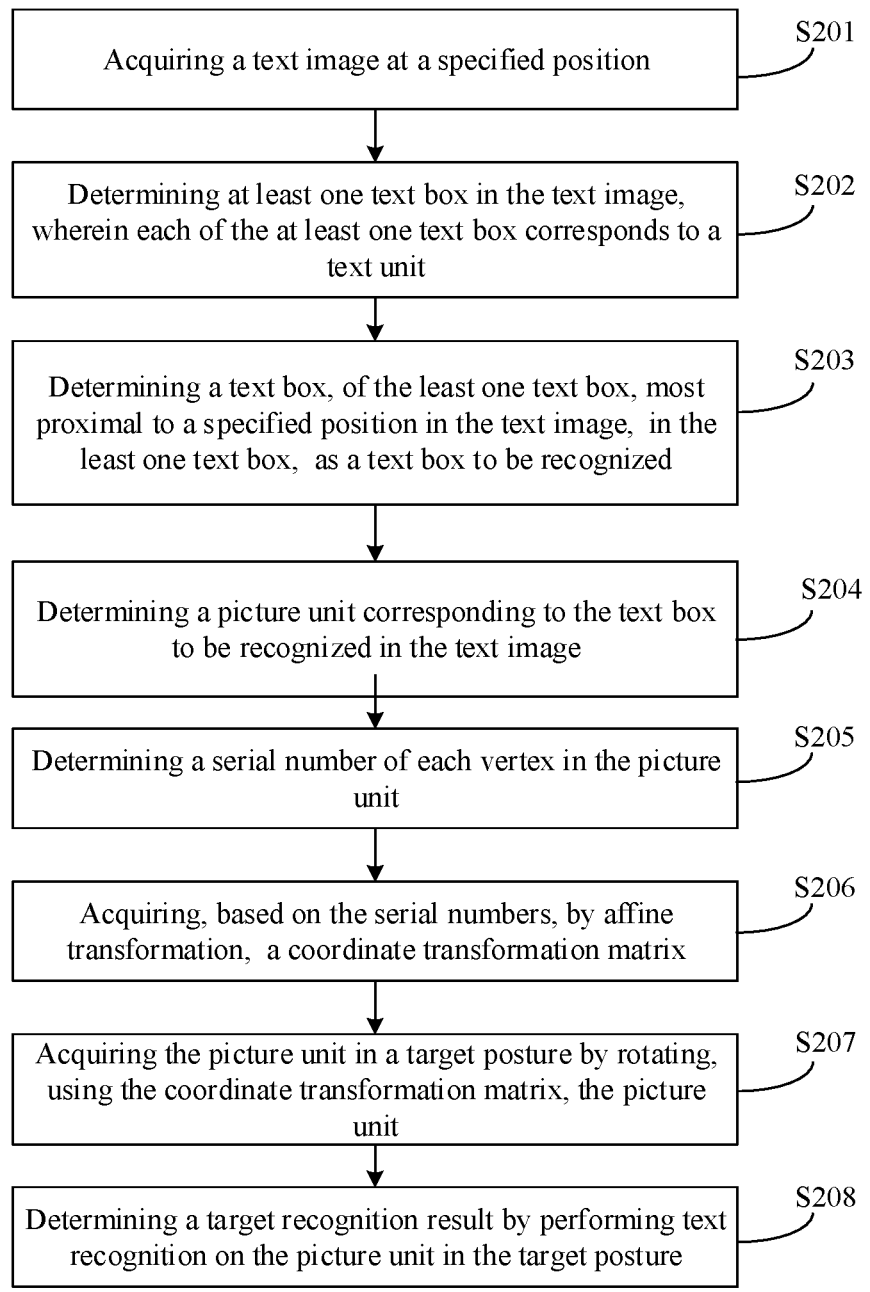
FIG. 4 is a schematic flowchart of another method for recognizing a text according to an embodiment of the present disclosure.

FIG. 4 is a flowchart of another method for recognizing a text according to an embodiment of the present disclosure. The method may be applicable to a text recognition pen (or a point-reading translation pen) with an image collection function. The method includes the following processes.

In S201, a text image at a specified position is acquired.

The specified position refers to a position in the text in the form of an article, a paragraph, a short sentence or the like. It should be known that the article, the paragraph, the short sentence or the like is composed of a text unit, such as words, word groups and phrases. The specified position is used for representing a position of a text unit where a user wants to perform recognition or translation. The specified position here may be acquired by the user in various ways. For example, the user may use a text recognition pen to determine the specified position by means of clicking on, or defining a range by drawing a circle on, a surface carrying the text, wherein the surface may be a surface of paper or a surface of a display screen, or the like. That is, the specified position is determined by a pen tip of the text recognition pen), and the determination method is not limited here. After the specified position is determined by the user, the text image is acquired by performing image collection on the text in the vicinity of the specified position, or the text within the range defined based on the specified position. The specific method for image collection is not limited here, which may be achieved by using an image collection device similar to that on the text recognition pen, and other electronic devices with an image collection function. The text image here refers to image information that are formed based on text information, such as the article, the paragraph, or the short sentence at a specified location.

Figure 5:
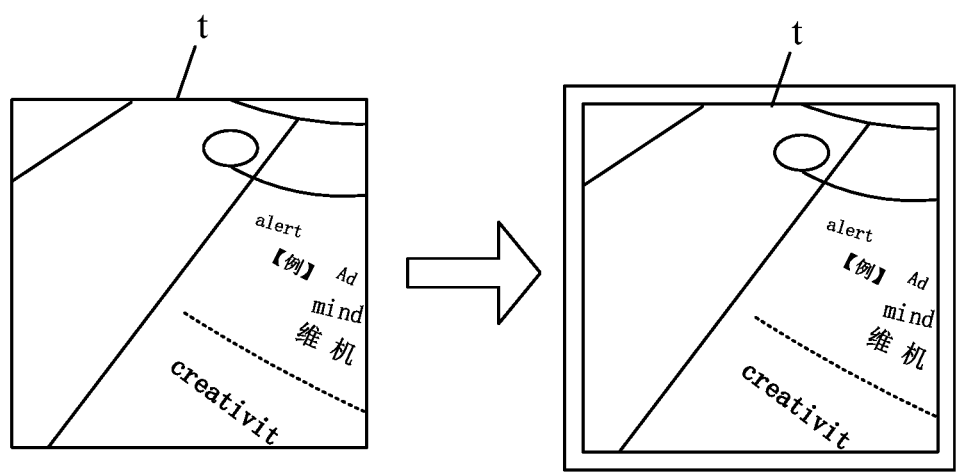
FIG. 5 is a schematic diagram of white border expansion in a method for recognizing a text according to an embodiment of the present disclosure.

To ensure that the text image acquired based on the specified position and image information at other positions in the text are not confused with each other, after the text image at the specified position is acquired and prior to an operation, such as substantial recognition, is performed on the text image, the method further includes preprocessing the text image. The preprocessing at least includes at least one of white border expansion and resolution increase. The white border expansion refers to performing the white border expansion on an edge of the text image. That is, a white region surrounding the text image is provided outside the edge of the text image. As shown in FIG. 5, the text image t may be expanded, from every side, outward by 5% of the length or width of the text image respectively, so as to improve the positioning effect of the text box at the edge. In addition, the resolution may be increased by adjusting sampling parameters or the like.

An executing body of the embodiment of the present disclosure may be a processing assembly in the text recognition pen. The processing assembly may include a control circuit or a processor, which is not limited in the embodiment of the present disclosure.

In S202, at least one text box is determined in the text image, wherein each of the at least one text box corresponds to one text unit.

After the text image at the specified position is acquired by process S201, the at least one text box may be determined in the text image in this process. Each of the at least one text box corresponds to one text unit. The purpose of the embodiment of the present disclosure is to recognize or translate a text unit, in a text (such as an article, a paragraph, or a short sentence), such as a word, a word group, or a phrase. Based on this, the acquired text image includes text content, such as the article, the paragraph, or the short sentence, wherein the text consists of a plurality of text units. The text unit here may refer to a word, a word group, a phrase or the like, provided that the text unit is a component element of the text. That is, each of the at least one text box may correspond to at least one word. The text units here is separated from each other in the form of the text box in the text image. That is, a corresponding text unit is separated by a text box. In this way, at least one text box is determined in the text image. In some embodiments, in this process, the detection and positioning of the text box may be achieved by using means of a pixel link method, a progressive scale expansion network (Senet), or the like. The detection refers to that the text unit is separated in the form of the text box in response to being detected in the text. The positioning includes: acquiring a position coordinate of each of the at least one text box.

In S203, a text box, of the at least one text box, most proximal to a specified position in the text image is determined as a text box to be recognized.

In the case that the at least one text box is determined in the text image by process S202, the text box to be recognized may be determined from the at least one text box in this process.

The positions of the pen tip of the text recognition pen and the image collection device of the text recognition pen are relatively fixed, so that the specified position may be a position where the pen tip of the text recognition pen clicks in the text image or a corresponding position (for example, the specified position may be a center position of a bottom edge of the text image).

Figure 6:
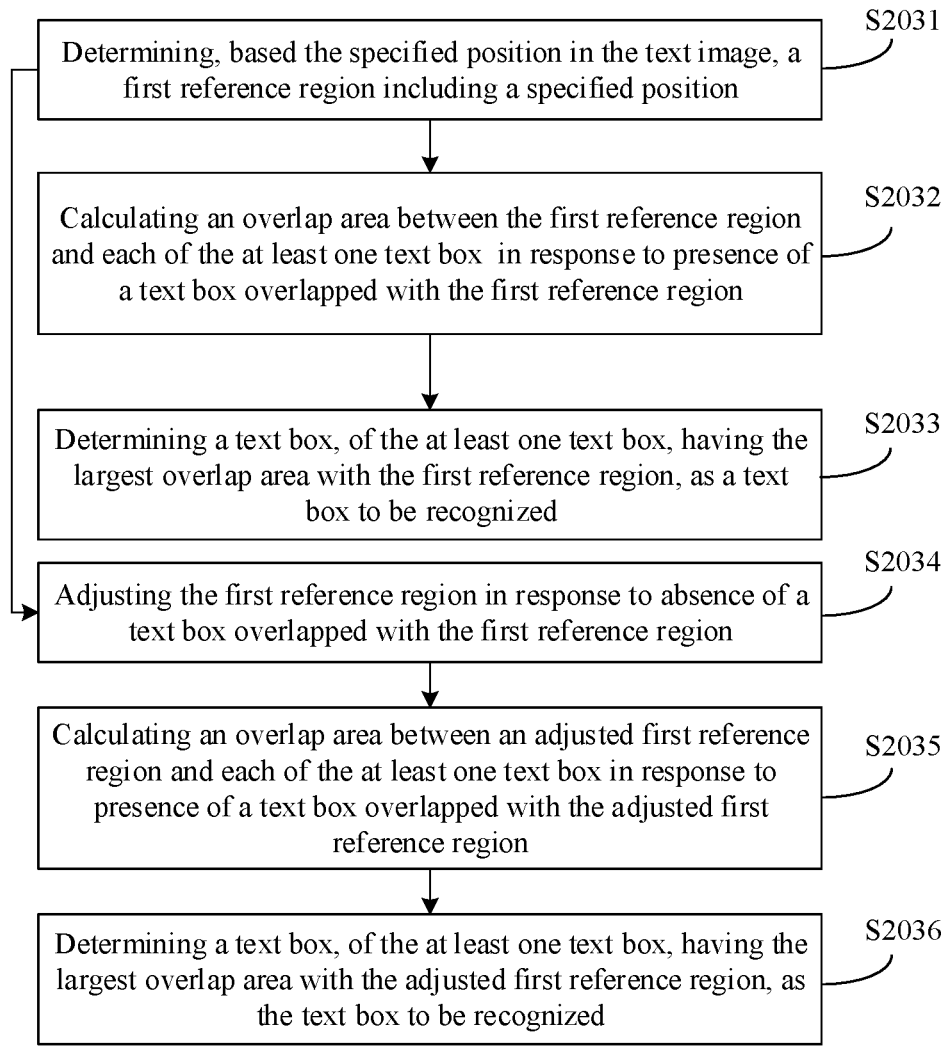
FIG. 6 is a schematic flowchart of determining a text box to be recognized in a method for recognizing a text according to an embodiment of the present disclosure.

Text boxes representing various text units are determined in the text image, wherein these text boxes contain a text box of a text unit that the user most expects to recognize or translate. The text unit that the user most expects to recognize or translate here refers to a text unit selected by the user using the pen recognition pen to click, define a range, or the like, and is also a text unit that is most proximal to the pen tip of the text recognition pen used by the user. Therefore, the text box. of the at least one text box, most proximal to the specified position in the text image may be determined as the text box to be recognized. In some embodiments, as shown in FIG. 6, S203 may include the following processes.

In S2031, a first reference region including the specified position is determined based on the specified position in the text image.

Figure 7:
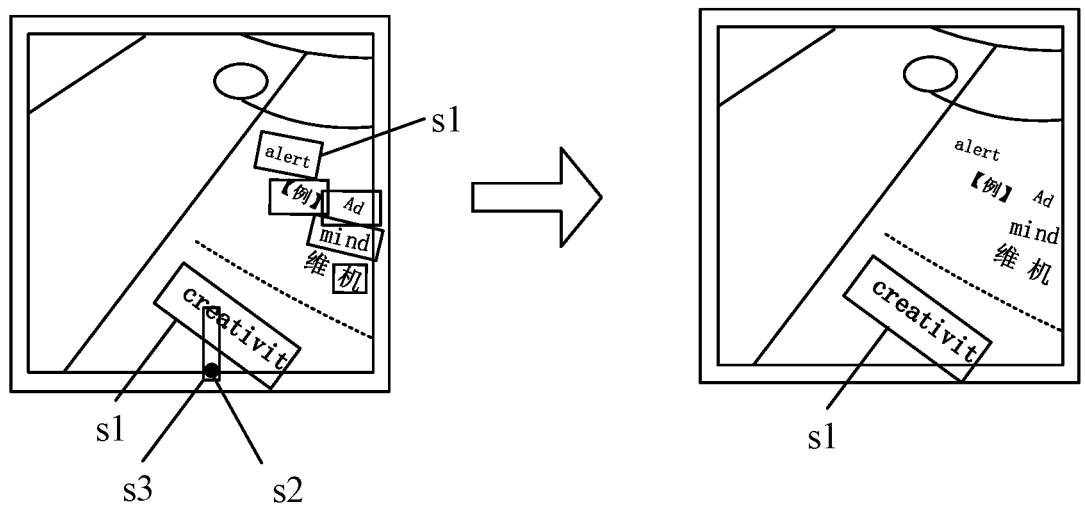
FIG. 7 is a schematic diagram of detecting a text box in a method for recognizing a text according to an embodiment of the present disclosure.
Figure 8:
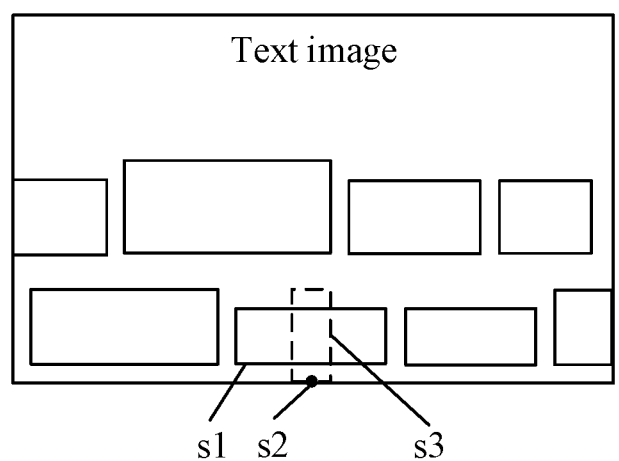
FIG. 8 is another schematic diagram of detecting a text box in a method for recognizing a text according to an embodiment of the present disclosure.

As mentioned in process S201, the user selects the text unit expected to be recognized or translated by means of determining the specified position. For example, when using the text recognition pen, the user clicks, using the pen tip, on the position of the text unit, which is expected to be recognized or translated. However, there is often a positional deviation between the specified position clicked here and the position, of the text unit, selected by the user. To accurately determine the text unit expected by the user, the text box, corresponding to the text unit, expected to be recognized or translated may be accurately determined from the plurality of text boxes included in the collected text image. In this process, the first reference region may be firstly determined based on the specified position. In specific implementation, as shown in FIGS. 7 and 8, the text image may include at least one text box s1, wherein the specified position s2 may be the center of the bottom edge of the text image, and the first reference region s3 including the center may be used as a virtual pen tip in the text image, which is used for determining the text box s1 corresponding to the text unit that is expected, by the user, to be recognized or translated in the text image. The processing assembly may set, based on factors such as the size of the text in the text image, a rectangular region with a fixed size as the first reference region s3. After that, the processing assembly of the text recognition pen may determine whether a text box s1 overlapped with the first reference region s3 is present. In response to presence of the text box s1 overlapped with the first reference region, S2032 may be performed, and in response to absence of the text box s1 overlapped with the first reference region, S2034 may be performed.

In S2032, an overlap area between the first reference region and each of the at least one text box is calculated respectively in response to presence of a text box overlapped with the first reference region.

After the first reference region is determined based on the specified position in process S201 as described above, in the case that the text box overlapped with the first reference region is present, the overlap area between the first reference region and each of the at least one text box in the text image may be calculated respectively. Any algorithm for calculating the overlap area between images may be used here. The overlap area represents the degree of mutual coverage or overlap between the first reference region and each of the at least one text box.

In S2033, a text box, of the at least one text box, having the largest overlap area with the first reference region is determined as the text box to be recognized.

After the overlap area between the first reference region and each of the at least one text box is calculated respectively by process S2032, the overlap areas corresponding to the various text boxes may be compared. Considering that the overlap area represents the degree of mutual coverage or overlap between the first reference region and each of the at least one text box, a larger overlap area means that the corresponding text box has a higher degree of coverage or overlap with the first reference region, and the text box is more proximal to the specified position in the text image. This further means that the text unit corresponding to the text box is more likely to be the text unit that is expected, by the user, to be recognized or translated.

As shown in FIGS. 7 and 8, the only text box s1 that is overlapped with the first reference region may be determined as the text box to be recognized.

In S2034, the first reference region is adjusted in response to absence of the text box overlapped with the first reference region.

In some cases, due to the small size of the first reference region and the sparse distribution of text boxes, or the reason that the specified position selected by the user is farther from the text unit which is actually expected to be recognized or translated, there may be no text box overlapped with the first reference region. In order to determine the text box to be recognized, which corresponds to the text unit that is expected, by the user, to be recognized or translated, the size of the first reference region may be adjusted. For example, the first reference region may be adjusted to a second reference region. Various adjustment methods are present here, provided that the size of the first reference region may be adjusted. For example, the first reference region may be extended towards a certain direction to increase the height by 1.5 times, thereby expanding the first reference region.

In S2035, an overlap area between an adjusted first reference region and each of the at least one text box is calculated respectively in response to presence of a text box overlapped with the adjusted first reference region.

After the first reference region is adjusted by process S2034, a text box having an overlap area with the adjusted first reference region may be determined again from various text boxes in the text image. In response to presence of the text box overlapped with the adjusted first reference region, the overlap area between the adjusted first reference region and each of the at least one text box may be calculated respectively.

In S2036, a text box, of the at least one text box, having the largest overlap area with the adjusted first reference region is determined as the text box to be recognized.

Similar to process S2033, the text box having the largest overlap area with the adjusted first reference region may be determined as the text box to be recognized.

In addition, the process of adjusting the first reference region is performed in response to absence of the text box overlapped with the adjusted first reference region. That is, S2034 is performed to continue to adjust the first reference region until a text box having an overlap area with the first reference region in the text image is present. In some embodiments, considering the calculating efficiency and other issues, the number of adjustment times may be limited. For example, in response to absence of the text box overlapped with the first reference region, the number of times for which the first reference region is adjusted is less than or equal to a predetermined threshold. For example, the predetermined threshold may be 3. In response to absence of a reference region overlapped with the text box after adjustment is performed for three times, a failure signal is returned, which means that the text unit, expected, by the user, to be recognized or translated, in the vicinity of the specified position is not present.

In S204, a picture unit corresponding to the text box to be recognized is determined in the text image.

In this process, the picture unit corresponding to the text box to be recognized may be determined in the text image, wherein the picture unit stores, in the form of an image, information about the text unit, corresponding to the text box to be recognized, expected, by the user, to be recognized or translated. The picture unit may include an image within the range defined by the text box to be recognized in the text image.

In S205, a serial number of each vertex in the picture unit is determined.

To facilitate the adjustment of the posture of the picture unit, the boundary of the acquired picture unit is of a polygonal shape. In the case that the posture of the picture unit is a large-angle inclined posture, the serial number of each vertex in the picture unit may be firstly determined. For example, in the case that the picture unit is of a serial shape, the serial numbers of four vertices of the picture unit are sequentially determined as 1, 2, 3 and 4.

In response to the picture unit being of a rectangular shape, the process of determining the serial numbers of the four vertices of the picture unit may include: a vertex as a reference point and a corresponding serial number are firstly determined based on the sizes of the length and the width of the picture unit, wherein the length here may refer to the size of the picture unit in a horizontal direction and the width may refer to the size of the picture unit in a longitudinal direction. For example, in response to the length of the picture unit being greater than the width thereof, the lowest vertex is determined as the reference point, and numbered as point 4; in response to the length of the picture unit being less than the width thereof, the lowest vertex is determined as the reference point, and numbered as point 3. After the vertex as the reference point and the corresponding serial number are determined, the serial numbers of the other vertexes are determined in a predetermined order. For example, the serial numbers of the other three vertexes may be sequentially determined in a clockwise or counterclockwise manner.

In S206, a coordinate transformation matrix is acquired, based on the serial numbers, by affine transformation.

After the serial number of each vertex of the picture unit is determined by process S205, the coordinate transformation matrix is acquired, based on the serial numbers of the various vertexes, by the affine transformation. The coordinate transformation matrix is configured to rotate the picture unit in a large-angle inclined posture to a target posture.

In some embodiments, in the embodiment of the present disclosure, the target posture may be a horizontal posture. A text recognition method in the related art may usually recognize characters in the horizontal posture. In addition, the target posture may also be other postures, such as a vertical posture, which is not limited in the embodiment of the present disclosure.

In S207, the picture unit in the target posture is acquired by rotating, using the coordinate transformation matrix, the picture unit.

Figure 9:
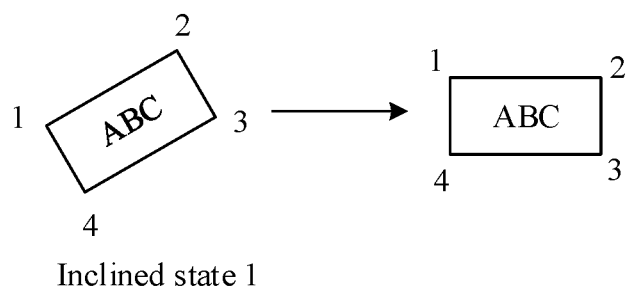
FIG. 9 is a schematic diagram of rotating a picture unit in a method for recognizing a text according to an embodiment of the present disclosure.
Figure 9:
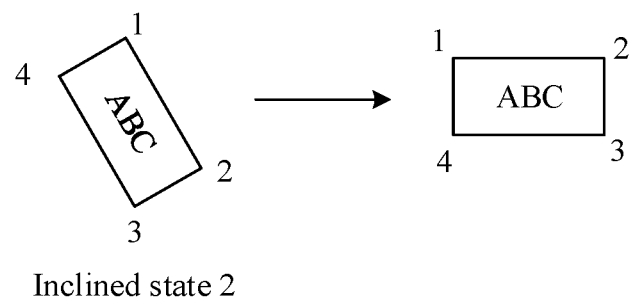
Figure 10:
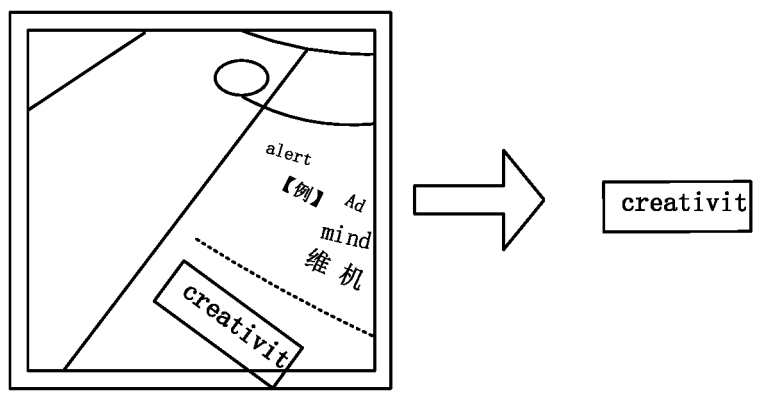
FIG. 10 is another schematic diagram of rotating a picture unit in a method for recognizing a text according to an embodiment of the present disclosure.

After the coordinate transformation matrix is acquired, based on the serial numbers, by the affine transformation by process S206, the picture unit in the target posture is acquired by rotating, using the coordinate transformation matrix, the picture unit. The method for changing picture posture here may be a method in the related art, which is not be repeated here. FIG. 9 shows a schematic diagram of the rotation of the picture unit in two inclined states. As shown in FIG. 9, in a inclined state 1, the length of the picture unit is greater than the width thereof; and in a inclined state 2, the length of the picture unit is less than the width thereof. FIG. 10 shows a schematic diagram of rotating a picture unit d1 in the figure in an example, in which "creativit" is rotated to the horizontal posture.

In S208, a target recognition result is determined by performing text recognition on the picture unit in the target posture.

Figure 11:
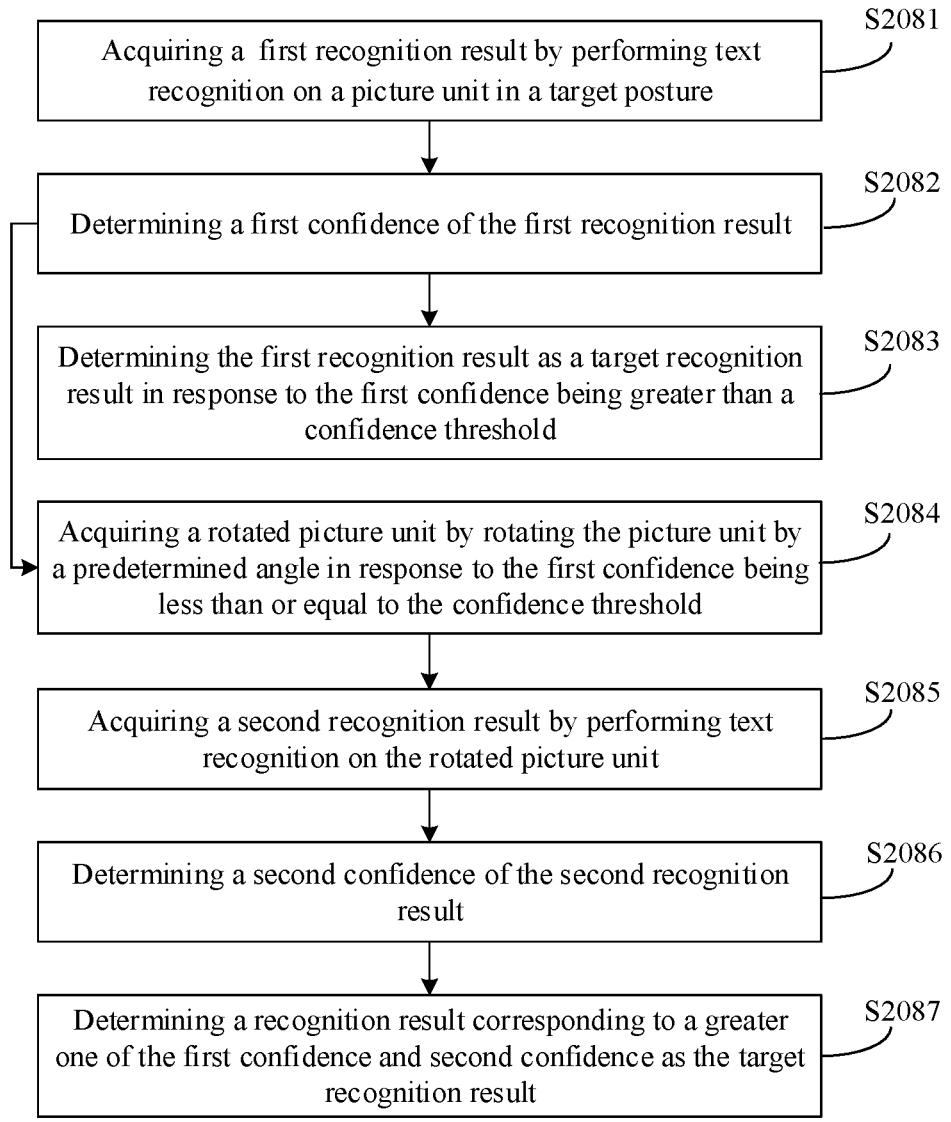
FIG. 11 is a schematic flowchart of determining a target recognition result in a method for recognizing a text according to an embodiment of the present disclosure.

After the picture unit is rotated to the target posture, the target recognition result may be acquired by performing text recognition on the picture unit in the target posture in this process. In this process, the picture unit in the target posture may be input into a text recognition model. Various text recognition algorithms, such as a convolutional recurrent neural network (CRNN) algorithm, may be used in the text recognition model. Since the picture unit being recognized is in the target posture, the accuracy of text recognition is significantly improved. As shown in FIG. 11, S208 may include the following processes.

In S2081, a first recognition result is acquired by performing text recognition on the picture unit in the target posture.

In this process, the picture unit has been adjusted to the target posture, and the first recognition result is acquired by performing text recognition on the picture unit by an existing text recognition method. The first recognition result here may be a literal recognition result or a translation result.

In S2082, a first confidence of the first recognition result is determined.

After the first recognition result is acquired by process S2081, due to printing and other reasons, a certain text element in the text unit may be recognized incorrectly. For example, a certain letter in a word is recognized incorrectly due to printing and other reasons, and a recognition error may also occur due to inaccurate text box or incorrect rotation. For the above reasons, verification may be performed based on the confidence. That is, the confidence of the first recognition result is determined.

The process of determining the first confidence of the first recognition result includes the followings processes:
1) Confidence of each of the plurality of text elements in the first recognition result is acquired. For example, in the case that the first recognition result here is represented as one word, text elements in the word are letters. In this way, the confidence of each letter in the word is acquired and calculated in this process.
2) An average of the confidences, in the first recognition result, of the text elements is acquired, and the average may be a geometric average.
3) An average of the confidences, in the first recognition result, of the text elements is determined as the first confidence. The first confidence here represents the overall recognition accuracy of the first recognition result. For example, the recognition accuracy of one word may be expressed by acquiring the first confidence of all letters in this word by calculation.

The processing assembly of the text recognition pen may compare the first confidence with a confidence threshold. In response to the first confidence being greater than the confidence threshold, S2083 is performed, and in response to the first confidence being less than or equal to the confidence threshold, S2084 is performed. The confidence threshold may be a predetermined threshold.

In S2083, the first recognition result is determined as the target recognition result in response to the first confidence being greater than the confidence threshold.

After the first confidence of the text elements in the first recognition result is acquired, based on the comparison between the first confidence and the predetermined threshold, in the case that the first confidence is greater than the predetermined threshold, which indicates that the first confidence is higher, the first recognition result corresponding to the first confidence may be determined as the target recognition result.

In S2084, a rotated picture unit is acquired by rotating the picture unit by a predetermined angle in response to the first confidence being less than or equal to the confidence threshold.

The picture unit in the horizontal posture may cause errors in the recognition of individual text elements or recognition mistake. In order to avoid the lower first confidence caused by the error or the recognition mistake, the picture unit may be rotated by the predetermined angle in the case that the first confidence is less than or equal to the confidence threshold, so as to acquire the rotated picture unit. Alternatively, the predetermined angle may be 90°.

In S2085, a second recognition result is acquired by performing text recognition on the rotated picture unit.

After the rotated picture unit is acquired, the second recognition result is acquired by performing text recognition on the rotated picture unit.

In S2086, a second confidence of the second recognition result is determined.

The process of acquiring the second confidence may be obtained by referring to the above process S2062. For example, S2086 may include: confidence of each of the plurality of text elements in the second recognition result is acquired; and an average of the confidences, in the second recognition result, of the text elements is determined as the second confidence.

Figures 12, 13:
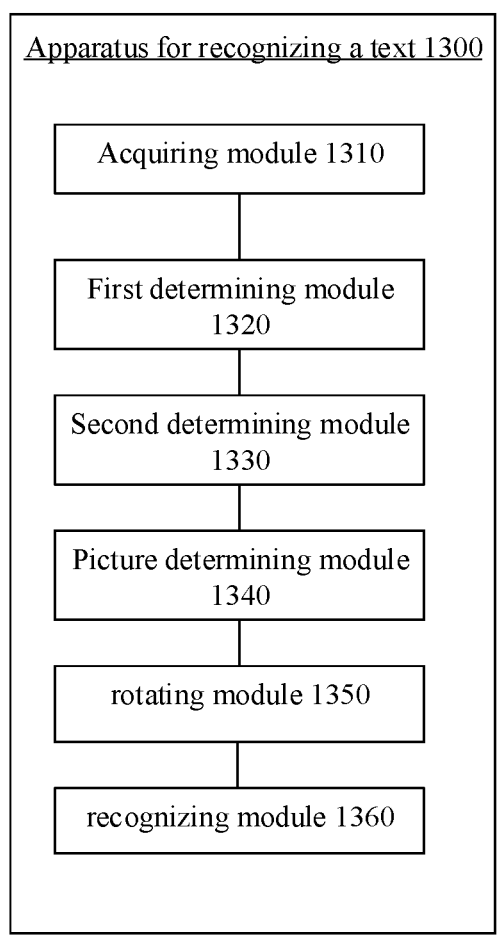
FIG. 12 is a schematic diagram of corresponding relationships between a picture unit in two postures and confidences in a method for recognizing a text according to an embodiment of the present disclosure.
FIG. 13 is a structural schematic diagram of an apparatus for recognizing a text according to an embodiment of the present disclosure.

In an exemplary embodiment, FIG. 12 shows a first confidence corresponding to "of" in a horizontal state, and a second confidence corresponding to "of" in a state acquired after "of" in the horizontal state is rotated by 90°.

In S2087, a recognition result corresponding to a greater one of the first confidence and second confidence is determined as the target recognition result.

After the first confidence and the second confidence are acquired by the above processes, the first confidence and the second confidence of the picture unit in different postures may be compared, and the recognition result corresponding to a greater one confidence may be determined as the target recognition result. After the recognition result is acquired, the recognition result may be displayed, or translated into other languages and then displayed.

The embodiment of the present disclosure can position and recognize the text units in the large-angle inclined text, so as to improve the recognition accuracy in the case that the user performs text recognition by using, for example, a text recognition pen.

In summary, according to the method for recognizing a text provided by the embodiment of the present disclosure, the text box including at least one word in the text image is firstly determined, and then character recognition is performed in the case that the text box to be recognized is rotated to a target posture suitable for recognition. In this way, the large-angle inclined text in the image can be recognized. As a result, the success rate and accuracy rate of recognition during text recognition are increased.

An embodiment of the present disclosure provides an apparatus for recognizing a text. The apparatus is used for recognizing or translating a text unit selected, by a user, from a text in the case that the user is browsing the text, so as to acquire a recognition result. The text here may refer to a text in the form of an article, a paragraph, a short sentence or the like. The text unit here refers to components in the text, such as a word, a word group and a phrase. The recognition result here may be a literal recognition result corresponding to the text unit, or a translation result. The apparatus for recognizing a text provided by the embodiment of the present disclosure may apply the method for recognizing a text according to the above embodiment, and the apparatus may be applicable to an image collection device or an electronic device with an image collection function, such as a text recognition pen (or a point-reading translation pen). The embodiment of the present disclosure takes the text recognition pen provided with the image collection device as an example for description. As shown in FIG. 13, the apparatus 1300 for recognizing a text includes:

an acquiring module 1310, configured to acquire a text image;
a first determining module 1320, configured to determine at least one text box in the text image, wherein each of the at least one text box corresponds to at least one word;
a second determining module 1330, configured to determine, from the at least one text box, a text box to be recognized;
a picture determining module 1340, configured to determine a picture unit corresponding to the text box to be recognized in the text image;
a rotating module 1350, configured to rotate the picture unit to a target posture; and a recognizing module 1360, configured to determine a target recognition result by performing text recognition on the picture unit in the target posture.

In summary, according to the apparatus for recognizing a text provided by the embodiment of the present disclosure, the text box including at least one word in the text image is firstly determined, and then character recognition is performed in the case that the text box to be recognized is rotated to a target posture suitable for recognition. In this way, the large-angle inclined text in the image can be recognized. As a result, the success rate and accuracy rate of recognition during text recognition are increased.

In some embodiments, the second determining module is configured to:
  determine a text box, of the at least one text box, most proximal to a specified position in the text image, as the text box to be recognized.

In some embodiments, the apparatus for recognizing a text is applicable to a text recognition pen; and the acquiring module is configured to:
  acquire the text image at a specified position, wherein the specified position is determined by a pen tip of text recognition pen.

In some embodiments, the second determining module is configured to:
  determine, based on the specified position in the text image, a first reference region including the specified position;
  calculate an overlap area between the first reference region and each of the at least one text box in response to presence of a text box overlapped with the first reference region; and
  determine a text box, of the least one text box, having the largest overlap area with the first reference region, as the text box to be recognized.

In some embodiments, the apparatus for recognizing a text further includes:
  an adjustment module, configured to adjust the first reference region in response to absence of a text box overlapped with the first reference region;
  an adjustment calculating module, configured to calculate an overlap area between the adjusted first reference region and each of the at least one text box in response to presence of a text box overlapped with the adjusted first reference region; and
  a third determining module, configured to determine a text box, of the least one text box, having the largest overlap area with the adjusted first reference region, as the text box to be recognized.

In some embodiments, the apparatus for recognizing a text further includes:
  an execution module, configured to perform the process of adjusting the first reference region in response to absence of a text box overlapped with the adjusted first reference region.

In some embodiments, a number of times, for which the first reference region is adjusted, is less than a predetermined threshold.

In some embodiments, the adjustment module is configured to adjust a size of the first reference region.

In some embodiments, the recognizing module includes:
  a first recognizing unit, configured to acquire a first recognition result by performing text recognition on the picture unit in the target posture;
  a first confidence determining unit, configured to determine a first confidence of the first recognition result; and
  a first determining unit, configured to determine the first recognition result as the target recognition result in response to the first confidence being greater than a confidence threshold.

In some embodiments, the first recognition result includes a plurality of text elements; and the first confidence determining unit is configured to:
  acquire a confidence, in the first recognition result, of each of the plurality of text elements; and
  determine an average of the confidences, in the first recognition result, of the text elements as the first confidence.

In some embodiments, the recognizing module further includes:
  a rotating unit, configured to acquire a rotated picture unit by rotating the picture unit by a predetermined angle in response to the first confidence being less than or equal to the confidence threshold;
  a second recognizing unit, configured to acquire a second recognition result by performing text recognition on the rotated picture unit;
  a second confidence determining unit, configured to determine a second confidence of the second recognition result; and
  a second determining unit, configured to determine a recognition result corresponding to a greater one of the first confidence and the second confidence as the target recognition result.

In some embodiments, the second recognition result includes a plurality of text elements; and the second confidence determining unit is configured to:
  acquire confidence of, in the second recognition result, each of the plurality of text elements; and
  determine an average, in the second recognition result, of the confidence of the text elements as the second confidence.

In some embodiments, the apparatus for recognizing a text further includes:
  a preprocessing module, configured to preprocess the text image, wherein the preprocessing at least includes at least one of providing a white region surrounding the text image outside an edge of the text image, and increasing a resolution.

In some embodiments, a boundary of the picture unit is polygonal; and the rotating module is configured to:
  determine a serial number of each vertex in the picture unit;
  acquire, based on the serial number, by affine transformation, a coordinate transformation matrix; and
  acquire the picture unit in the target posture by rotating, using the coordinate transformation matrix, the picture unit.

In summary, according to the apparatus for recognizing a text provided by the embodiment of the present disclosure, the text box including at least one word in the text image is firstly determined, and then character recognition is performed in the case that the text box to be recognized is rotated to a target posture suitable for recognition. In this way, the large-angle inclined text in the image can be recognized. As a result, the success rate and accuracy rate of recognition during text recognition are increased.

An embodiment of the present disclosure further provides a storage medium. The storage medium is a computer-readable medium and stores a computer program thereon. The computer program, when loaded and run by a processor, causes the processor to perform the method according to a first embodiment of the present disclosure. The embodiment of the present disclosure can position and recognize text units in the large-angle inclined text, so as to improve the recognition accuracy in the case that a user performs text recognition by using, for example, a point-reading translation pen.

Figure 14:
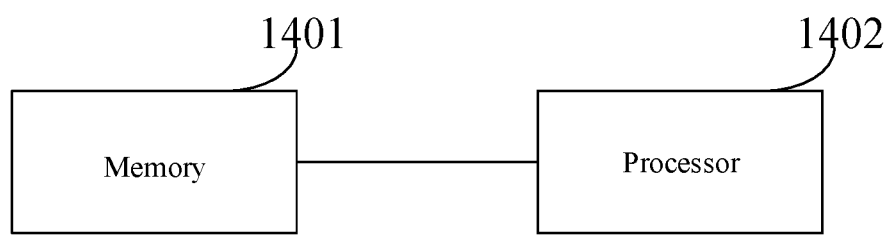
FIG. 14 is a structural schematic diagram of an electronic device according to an embodiment the present disclosure.

The present disclosure further provides an electronic device. A structural schematic diagram of the electronic device may be shown in FIG. 14. The electronic device at least includes a memory 1401 and a processor 1402. The memory 1401 stores a computer program thereon, wherein the computer program on the memory 1401, when loaded and run by the processor 1402, causes the processor to perform the method according to the embodiment of the present disclosure. The embodiment of the present disclosure can position and recognize text units in the large-angle inclined text, so as to improve the recognition accuracy in the case that a user performs text recognition by using, for example, a point-reading translation pen.

Furthermore, although exemplary embodiments have been described herein, any and all embodiments with equivalent elements, modifications, omissions, combinations (such as a solution that various embodiments are combined), adaptations, or changes based on the present disclosure shall be included in the scope. Elements in the claims are to be construed broadly based on the language employed in the claims, which are not intended to limit the examples described in the description or during the practice of the present application, and the examples are to be construed as being non-exclusive. Therefore, the description and examples are intended to be regarded as examples only. True scope and spirit are indicated by the following claims, and the full scope of equivalents thereof.

The above description is intended to be illustrative and not restrictive. For example, the above examples (or one or more solutions thereof) may be used in combination with each other. For example, those of ordinary skill in the art may use other embodiments after reading the above description. In addition, in the above detailed description, various features may be grouped together to simplify the present disclosure, which shall not be construed as an intention that an unclaimed disclosed feature is essential to any claim. Rather, the subject matter of the present disclosure may be less than all features of a particular disclosed embodiment. Thus, the following claims are hereby incorporated into the detailed description as examples or embodiments, wherein each claim stands on its own as a separate embodiment. And it is contemplated that these embodiments may be combined with each other in various combinations or permutations.

The scope of the present disclosure should be determined with reference to the appended claims, along with the full scope of equivalents to which such claims are entitled. The above embodiments are only exemplary embodiments of the present disclosure, and are not intended to limit the present disclosure, and the protection scope of the present disclosure is defined by the claims. Those skilled in the art can make various modifications or equivalent replacements to the present disclosure within the spirit and protection scope of the present disclosure, and such modifications or equivalent replacements should also be regarded as falling within the protection scope of the present disclosure.

What is claimed is:

1. A method for recognizing a text, comprising:
    acquiring a text image;
    determining at least one text box in the text image, wherein each of the at least one text box corresponds to at least one word;
    determining, from the at least one text box, a text box to be recognized;
    determining a picture unit corresponding to the text box to be recognized in the text image;
    rotating the picture unit to a target posture; and
    determining a target recognition result by performing text recognition on the picture unit in the target posture;
    wherein a boundary of the picture unit is polygonal, and rotating the picture unit to the target posture comprises:
    determining a serial number of each vertex in the picture unit;
    acquiring, based on the serial number, by affine transformation, a coordinate transformation matrix; and
    acquiring the picture unit in the target posture by rotating, using the coordinate transformation matrix, the picture unit.

2. The method according to claim 1, determining, from the at least one text box, the text box to be recognized comprises:
    determining a text box, of the at least one text box, most proximal to a specified position in the text image, as the text box to be recognized.

3. The method according to claim 1, wherein determining the target recognition result by performing text recognition on the picture unit in the target posture comprises:
    acquiring a first recognition result by performing text recognition on the picture unit in the target posture;
    determining a first confidence of the first recognition result; and
    determining the first recognition result as the target recognition result in response to the first confidence being greater than a confidence threshold.

4. The method according to claim 1, wherein prior to determining the at least one text box in the text image, the method further comprises:
    preprocessing the text image, wherein the preprocessing at least comprises at least one of providing a white region surrounding the text image outside an edge of the text image, and increasing a resolution.

5. The method according to claim 2, wherein the method is applicable to a text recognition pen; and acquiring the text image comprises:
    acquiring the text image at the specified position, wherein the specified position is determined by a pen tip of the text recognition pen.

6. The method according to claim 2, wherein determining the text box, of the at least one text box, most proximal to the specified position in the text image, as the text box to be recognized comprises:
    determining, based on the specified position in the text image, a first reference region comprising the specified position;
    calculating an overlap area between the first reference region and each of the at least one text box in response to presence of a text box overlapped with the first reference region; and
    determining a text box, of the at least one text box, having the largest overlap area with the first reference region, as the text box to be recognized.

7. The method according to claim 3, wherein the first recognition result comprises a plurality of text elements; and determining the first confidence of the first recognition result comprises:
    acquiring a confidence, in the first recognition result, of each of the plurality of text elements; and determining an average of the confidences, in the first recognition result, of the text elements as the first confidence.

8. The method according to claim 3, further comprising:
acquiring a rotated picture unit by rotating the picture unit by a predetermined angle in response to the first confidence being less than or equal to the confidence threshold;
acquiring a second recognition result by performing text recognition on the rotated picture unit;
determining a second confidence of the second recognition result; and
determining a recognition result corresponding to a greater one of the first confidence and the second confidence as the target recognition result.

9. The method according to claim 6, wherein upon determining, based on the specified position in the text image, the first reference region comprising the specified position, the method further comprises:
adjusting the first reference region in response to absence of a text box overlapped with the first reference region;
calculating an overlap area between the adjusted first reference region and each of the at least one text box in response to presence of a text box overlapped with the adjusted first reference region; and
determining a text box, of the at least one text box, having the largest overlap area with the adjusted first reference region, as the text box to be recognized.

10. The method according to claim 8, wherein the second recognition result comprises a plurality of text elements; and determining the second confidence of the second recognition result comprises:
acquiring a confidence, in the second recognition result, of each of the plurality of text elements; and
determining an average of the confidences, in the second recognition result, of the text elements as the second confidence.

11. The method according to claim 9, further comprising:
performing the process of adjusting the first reference region in response to absence of a text box overlapped with the adjusted first reference region.

12. The method according to claim 9, wherein adjusting the first reference region comprises:
adjusting a size of the first reference region.

13. The method according to claim 11, wherein a number of times, for which the first reference region is adjusted, is less than a predetermined threshold.

14. A non-transitory storage medium storing a computer program thereon, wherein the computer program, when loaded and run by a processor, causes the processor to perform:
acquiring a text image;
determining at least one text box in the text image, wherein each of the at least one text box corresponds to at least one word;
determining, from the at least one text box, a text box to be recognized;
determining a picture unit corresponding to the text box to be recognized in the text image;
rotating the picture unit to a target posture; and
determining a target recognition result by performing text recognition on the picture unit in the target posture;
wherein a boundary of the picture unit is polygonal, and the computer program, when loaded and run by the processor, causes the processor to further perform:
determining a serial number of each vertex in the picture unit;
acquiring, based on the serial number, by affine transformation, a coordinate transformation matrix; and
acquiring the picture unit in the target posture by rotating, using the coordinate transformation matrix, the picture unit.

15. An electronic device, comprising: a memory storing a computer program thereon, and a processor, wherein the computer program, when loaded and run by the processor, causes the processor to perform;
acquiring a text image;
determining at least one text box in the text image, wherein each of the at least one text box corresponds to at least one word;
determining, from the at least one text box, a text box to be recognized;
determining a picture unit corresponding to the text box to be recognized in the text image;
rotating the picture unit to a target posture; and
determining a target recognition result by performing text recognition on the picture unit in the target posture;
wherein a boundary of the picture unit is polygonal, and the computer program, when loaded and run by the processor, causes the processor to perform:
determining a serial number of each vertex in the picture unit;
acquiring, based on the serial number, by affine transformation, a coordinate transformation matrix; and
acquiring the picture unit in the target posture by rotating, using the coordinate transformation matrix, the picture unit.

16. The electronic device according to claim 15, wherein the computer program, when loaded and run by the processor, causes the processor to perform:
determining a text box, of the at least one text box, most proximal to a specified position in the text image, as the text box to be recognized.

17. The electronic device according to claim 16, wherein the electronic device is a text recognition pen, the computer program, when loaded and run by the processor, causes the processor to perform:
acquiring the text image at the specified position, wherein the specified position is determined by a pen tip of the text recognition pen.

18. The electronic device according to claim 16, wherein the computer program, when loaded and run by the processor, causes the processor to perform:
determining, based on the specified position in the text image, a first reference region comprising the specified position;
calculating an overlap area between the first reference region and each of the at least one text box in response to presence of a text box overlapped with the first reference region; and
determining a text box, of the at least one text box, having the largest overlap area with the first reference region, as the text box to be recognized.

19. The electronic device according to claim 18, wherein the computer program, when loaded and run by the processor, causes the processor to perform:
adjusting the first reference region in response to absence of a text box overlapped with the first reference region;
calculating an overlap area between the adjusted first reference region and each of the at least one text box in response to presence of a text box overlapped with the adjusted first reference region; and determining a text box, of the at least one text box, having the largest overlap area with the adjusted first reference region, as the text box to be recognized.

20. The electronic device according to claim 19, wherein the computer program, when loaded and run by the processor, causes the processor to perform:
performing the process of adjusting the first reference region in response to absence of a text box overlapped with the adjusted first reference region.

* * * * *